(12) United States Patent
Hanjono (10) Patent No.: US 6,974,152 B2
(45) Date of Patent: Dec. 13, 2005

(54) VEHICLE OCCUPANTS PROTECTION SYSTEM

(75) Inventor: Hiroshi Hanjono, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 206 days.

(21) Appl. No.: 10/355,623

(22) Filed: Jan. 31, 2003

(65) Prior Publication Data

US 2003/0146606 A1 Aug. 7, 2003

(30) Foreign Application Priority Data

Feb. 4, 2002 (JP) ........................................ 2002-027462

(51) Int. Cl.[7] ........................... B60R 21/04; B60R 21/22
(52) U.S. Cl. ............................... 280/728.3; 280/730.2; 280/751; 296/187.05
(58) Field of Search .......................... 280/730.2, 730.1, 280/728.2, 728.3, 751; 296/187.05

(56) References Cited

U.S. PATENT DOCUMENTS

| | | | |
|---|---|---|---|
| 5,163,730 A | | 11/1992 | Welch |
| 6,142,506 A | | 11/2000 | Patel et al. |
| 6,173,990 B1 | * | 1/2001 | Nakajima et al. ........ 280/730.2 |
| 6,530,594 B1 | * | 3/2003 | Nakajima et al. ........ 280/730.2 |

FOREIGN PATENT DOCUMENTS

| | | |
|---|---|---|
| DE | 198 12 737 | 5/1999 |
| EP | 0 841 221 | 5/1998 |
| JP | A-10-138861 | 5/1998 |
| JP | A-11-091489 | 4/1999 |
| JP | 3147172 B2 | 1/2001 |

* cited by examiner

Primary Examiner—Peter C. English
(74) Attorney, Agent, or Firm—Hamre, Schumann, Mueller & Larson, P.C.

(57) ABSTRACT

A vehicle occupants protection system wherein a front pillar garnish is mounted on a passenger compartment side of a front pillar which supports a roof with a predetermined amount of space being maintained therebetween for accommodating a side airbag, as well as a small impact absorbing member for absorbing an impact of such a small magnitude that the side airbag remains unopened, whereby the side airbag is inflated by gas generated when an impact of a predetermined magnitude or more is applied to a side of a vehicle so as to expand into a passenger compartment while forcibly opening one end portion of the front pillar garnish. A bottom surface of the small impact absorbing member is divided into two portions, a rear half portion located closer to the side airbag and a front half portion located farther away from the side airbag. Only the front half portion is attached to the front pillar garnish.

5 Claims, 11 Drawing Sheets

VEHICLE OCCUPANTS PROTECTION SYSTEM

FIELD OF THE INVENTION

The present invention relates to a technique for improving a vehicle occupants protection system in which the protection of occupants is enhanced at a pillar and a roof side portion of a vehicle when an impact is applied to a side of the vehicle.

BACKGROUND OF THE INVENTION

In recent years, developments have been made in order to increase protection for vehicle occupants and, in particular, the heads of the occupants when an impact is applied to a side of the vehicle.

A technique has been developed for this type of vehicle occupants protection system in which a roof side airbag is installed, for example, from a pillar to a side edge of a roof of the vehicle, whereby the roof side airbag is caused to inflate along the door windows in such a way as a curtain falls when an impact of a predetermined magnitude or more is applied to a side of the vehicle.

In addition, another technique has been developed for another type of vehicle occupants protection system in which a pillar garnish is mounted on a passenger compartment side of a pillar with a predetermined amount of space being provided therebetween for accommodating therein a small impact absorbing member, so that when an impact of a small magnitude is applied to a side of the vehicle, the impact so applied can be absorbed by the small impact absorbing member.

Furthermore, a technique has been developed in which both the roof side airbag and the small impact absorbing member are provided at the pillar portion. This type of vehicle occupants protection system is known as, for example, an "automotive occupants protection system layout construction" disclosed in Japanese Examined Patent Publication No. 3147172 (hereinafter, referred to as the "related art"). The summary of the related art will be described below with reference to FIGS. 11(a) to 11(c).

Figure 11:
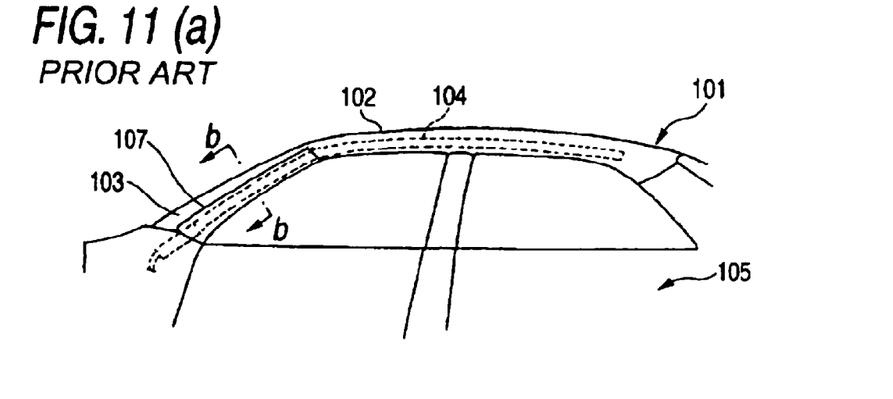
FIGS. 11(a) to 11(c) are schematic diagrams showing a vehicle occupants protection system as known in the art.

FIGS. 11(a) to 11(c) are schematic views of a related art system, and the figures so used here are FIGS. 1, 2 and 4 of Japanese Examined Patent Publication No. 3147172. However, please note that different reference numbers are used. FIG. 11(a) shows a side construction of the system as viewed from a passenger compartment side of the vehicle. FIG. 11(b) shows a cross-sectional construction of the system taken along the line b—b of FIG. 11(a). FIG. 11(c) corresponds with FIG. 11(b) and shows the system after impact.

FIG. 11(a) shows that a bag 104 is installed in a side edge of a roof 102 and part of a front pillar portion 103 of a vehicle 101. The bag 104 is a roof side airbag for protecting the upper bodies of occupants when an impact of a predetermined magnitude or more is applied to a side of the vehicle.

FIG. 11(b) shows that a pillar garnish 107 is mounted on a passenger compartment 105 side of the front pillar portion 103 with a space 106 being maintained therebetween for accommodating therein the bag 104, as well as a rib 108 (corresponding to a small impact absorbing member of the invention) for absorbing an impact of such a small magnitude that the bag 104 remains unopened.

The pillar garnish 107 includes a thick base portion 111 which surrounds the rib 108 and a thin bag accommodating portion 112 which surrounds the bag 104. The base portion 111 is attached to the front pillar portion 103, whereas the bag accommodating portion 112 can be deformed from a proximal end point 113 of the bag accommodating portion 112 to bend towards the passenger compartment 105 side.

A fixing portion 104a of the bag 104, the rib 108 and the base portion 111 of the pillar garnish 107 are bolted together to the front pillar portion 103. A distal end 114 of the bag accommodating portion 112 is elastically supported by an opening weather-strip 115 disposed at a rear half portion of the front pillar portion 103.

As shown in FIG. 11(c), the bag 104 can expand into the passenger compartment 105 while forcibly opening the bag accommodating portion 112 due to gas generated when an impact of a predetermined magnitude or more is applied to a side of the vehicle. As this occurs, the bag accommodating portion 112 deforms from the proximal end point 113 of the bag accommodating portion 112 to the passenger compartment 105 side.

The pillar garnish 107 used in the related art is required (1) to function as an interior material having an impact absorbing construction in an ordinary condition where no impact is applied, (2) to ensure the quick transmission of the impact to the rib 108 when an impact of such a small magnitude that the bag 104 remains unopened is applied, and (3) to deform sufficiently enough when the bag 104 opens that the bag 104 is allowed to inflate quickly and smoothly.

In general, the integration of the rib 108 to the pillar garnish 107 is implemented by attaching the rib 108 to the pillar garnish 107 over the entirety of a bottom surface thereof. This procedure allows the pillar garnish 107 and the rib 108 to be attached to the front pillar portion 103 at the same time.

Only the bag accommodating portion 112, which extends distally from the proximal end point 113 of the pillar garnish 107, is deformed by the force of the expanding bag 104. Since the bag accommodating portion 112 is intended only to surround the bag 104, its length is short, extending from the proximal end point 113 to the distal end 114. The bag accommodating portion 112 deforms in proportion to the amount the bag 104 inflates. Therefore, in order for the short bag accommodating portion 112 to deform significantly, a large magnitude of force must be applied to the bag accommodating portion 112 and, in particular, to the proximal end point 113.

If the bag accommodating portion 112 is made too thin, then it becomes too soft and cannot function sufficiently as an interior material. In contrast, if it is made too thick, then the bag accommodating portion 112 becomes too hard and requires an excessively large magnitude of force to be applied, in particular, to the proximal end point 113. It is not easy to protect the proximal end point 113 against such an excessively large magnitude of force.

SUMMARY OF THE INVENTION

To cope with the deficiencies discussed above, an object of the invention is to provide a vehicle occupants protection system which allows the pillar garnish (1) to function as the interior material having an impact absorbing construction in an ordinary condition, (2) to ensure the quick transmission of the impact to a small impact absorbing member when an impact of such a small magnitude that a roof side airbag remains unopened is applied, and (3) to deform so sufficiently when the roof side airbag opens that the roof side airbag is allowed to inflate quickly and smoothly.

With these objectives in mind, one possible embodiment of the present invention includes a vehicle occupants protection system wherein a pillar garnish is mounted on a passenger compartment side of a pillar which supports a roof with a predetermined amount of space being maintained therebetween for accommodating a roof side airbag, as well as a small impact absorbing member for absorbing an impact of such a small magnitude that the roof side airbag remains unopened. The roof side airbag is inflated by gas generated when an impact of a predetermined magnitude or more is applied to a side of a vehicle so as to expand into a passenger compartment of the vehicle while forcibly opening one end portion of the pillar garnish. The vehicle occupants protection system is characterized by the partial attachment of a bottom surface of the small impact absorbing member to the pillar garnish. The bottom surface can be divided into two portions, a rear half portion being closer to the roof side airbag and a front half portion being farther away from the roof side airbag. Only the front half portion is attached to the pillar garnish.

Deformation occurs over the portion of the pillar garnish that is attached to the bottom surface of the small impact absorbing member. This portion extends from a proximal end to a distal end of the pillar garnish and is known as the deformation end. Therefore, deformation occurs over a longer length of the pillar garnish in comparison to the system discussed above with respect to FIG. 11(a), 11(b), and 11(c). This longer length can facilitate the deformation of the deformation end of the pillar garnish, allowing it to bend towards the passenger compartment side of the vehicle in proportion the increase in length. Therefore, the deformation end of the pillar garnish is allowed to deform significantly upon a smaller application of force since it is not restricted by the small impact absorbing member. Furthermore, the deformation end portion of the front pillar garnish can be deformed easily enough to allow the roof side airbag to inflate quickly and smoothly upon deployment.

Moreover, the front half portion of the bottom surface of the small impact absorbing member is maintained in the attached condition. In other words, even after the roof side airbag has been inflated outwardly upon deployment, the small impact absorbing member remains attached to the pillar along with the pillar garnish. Consequently, the small impact absorbing member can perform its impact absorbing function even after the roof side airbag has been deployed.

In addition, the length of the deformation end of the pillar garnish can be enlarged extremely easily without altering the layout relationship between the roof side airbag and the small impact absorbing member and/or enlarging the space provided between the front pillar and the front pillar garnish.

Furthermore, in the ordinary condition where no impact is applied, the front pillar garnish can sufficiently perform its function as the interior material.

Moreover, when a side of the vehicle receives an impact of such a small magnitude that the roof side airbag remains unopened, the impact can be transmitted quickly and efficiently from the front pillar garnish to the small impact absorbing member.

A second possible embodiment of the invention includes a vehicle occupants protection system wherein a pillar garnish is mounted on a passenger compartment side of a pillar which supports a roof with a predetermined amount of space being maintained therebetween. Within the space resides a roof side airbag and a small impact absorbing member for absorbing an impact of such a small magnitude that the roof side airbag remains unopened with a bottom surface of the small impact absorbing member being attached to the pillar garnish. The roof side airbag is inflated by gas generated when an impact of a predetermined magnitude or more is applied to a side of a vehicle so as to expand into a passenger compartment of the vehicle while forcibly opening one end portion of the pillar garnish. The vehicle occupants protection system is characterized in that the bottom surface of the small impact absorbing member is configured to be attached to the pillar garnish through such methods as bonding, heat crimping, welding, ultrasonic welding, machine screwing or clipping. The system is further characterized by a difference in the attachment strength between the pillar garnish and each of two bottom portions of the small impact absorbing member. The bottom surface of the small impact absorbing member is divided into a rear half portion located closer to the roofside airbag and a front half portion located farther from the roofside airbag. The attachment between the pillar garnish and the rear half portion is weaker than the attachment between the pillar garnish and the front half portion. Moreover, the attachment between the pillar garnish and the rear half portion is weak enough to allow the pillar garnish to separate from the bottom surface of the small impact absorbing member when the pillar garnish is deformed.

A strong separation force is applied to the portion where the pillar garnish and the bottom surface of the small impact absorbing member are joined together when the pillar garnish is deformed by the force with which the roof side airbag is opened.

To deal with this, the attachment between the pillar garnish and the rear bottom portion of the small impact absorbing member is configured to be weaker than the attachment between the pillar garnish and the front bottom portion of the small impact absorbing member. In fact, the attachment is so weak that the pillar garnish is allowed to separate from the bottom surface of the small impact absorbing member when the pillar garnish is deformed. Specifically, the pillar garnish separates from the rear half portion of the bottom surface of the small impact absorbing member. Consequently, deformation occurs over a deformation end of the front pillar garnish located between a proximal end and a distal end of the front pillar garnish. The proximal end is located at the boundary point between the front half portion and the rear half portion of the bottom surface of the small impact absorbing member. The length of the deformation end is larger in comparison to that discussed with respect to FIG. 11(a), 11(b), and 11(c). This can facilitate the deformation of the deformation end of the front pillar garnish, allowing it to bend towards the passenger compartment side of the vehicle in proportion to the increase in length. This allows the deformation end of the front pillar garnish to deform significantly upon a smaller application of force since it is not restricted by the small impact absorbing member. The deformation end of the front pillar garnish is thus allowed to deform easily by an amount sufficient to allow the roof side airbag to inflate outwardly quickly and smoothly.

Moreover, only the rear half portion of the bottom surface of the small impact absorbing member is separated from the pillar garnish while the front half portion remains attached. Due to this, even after the roof side airbag has been inflated upon deployment, the small impact absorbing member remains attached to the pillar along with the pillar garnish. Consequently, the small impact absorbing member can absorb an impact to the side of the vehicle even after the roof side airbag has been deployed.

In addition, the length of the deformation end of the pillar garnish can be enlarged extremely easily without altering the layout relationship between the roof side airbag and the small impact absorbing member and/or enlarging the space provided between the pillar and the front pillar garnish.

Furthermore, in the ordinary condition where no impact is applied, the front pillar garnish can sufficiently perform its function to act as the interior material.

In addition, when the side of the vehicle receives an impact of such a small magnitude that the roof side airbag remains unopened, the impact so received can be transmitted quickly and efficiently from the front pillar garnish to the small impact absorbing member.

DETAILED DESCRIPTION OF THE PREFERRED EMBODIMENTS

One possible embodiment of the present invention will be described below with reference to the accompanying drawings. Note that when used herein, terms such as "front", "rear", "left", "right", "upper" and "lower" denote respective directions as viewed from the driver. In addition, the drawings are to be viewed in the direction in which the reference numbers are oriented.

Figure 1:
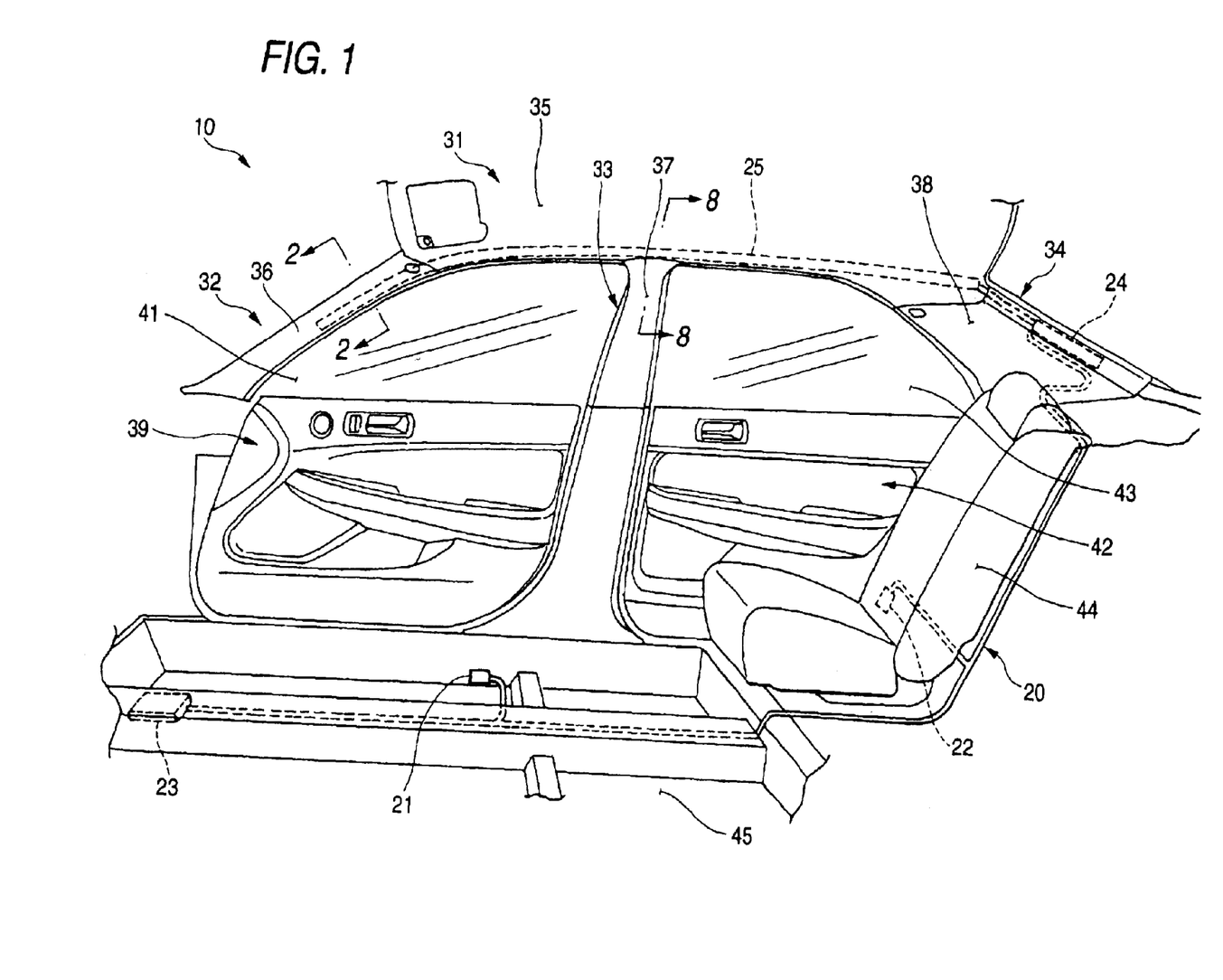
FIG. 1 is a side view of a vehicle according to one possible embodiment of the invention as viewed from a passenger compartment side thereof.

FIG. 1 is a side view of a vehicle configured in accordance with one possible embodiment of the present invention as viewed from a passenger compartment side of the vehicle. The figure shows that a roof side airbag system 20 is installed in the vehicle 10. The roof side airbag system 20 is designed so as to protect the upper bodies of occupants when an impact of a predetermined magnitude or more is applied to a side of the vehicle 10. The roof side airbag system 20 is designed to include impact detecting sensors 21, 22 for detecting that an impact of a predetermined magnitude or more is applied to a side of the vehicle 10, a control unit 23 for processing sensor signals from the impact detecting sensors 21, 22, an inflator 24 designed to inject gas according to a control signal from the control unit 23, and a roof side airbag 25 designed to be inflated by the gas from the inflator 24. The roof side airbag 25 is arranged and configured so as to be installed in a side edge of a roof 31 and part of a front pillar 32, which is one of a plurality of pillars which support the roof 31.

In the figure, reference numeral 33 denotes: a center pillar; 34: a rear pillar; 35: a roof lining constituting a lining for the roof 31; 36: a front pillar garnish constituting a lining for the front pillar 32; 37: a center pillar garnish constituting a lining for the center pillar 33; 38: a rear pillar garnish constituting a lining for the rear pillar 34; 39: a front door, 41: a window glass in the front door 39; 42: a rear door; 43: a window glass in the rear door 42; 44: a rear seat; and 45: a floor.

Figure 2:
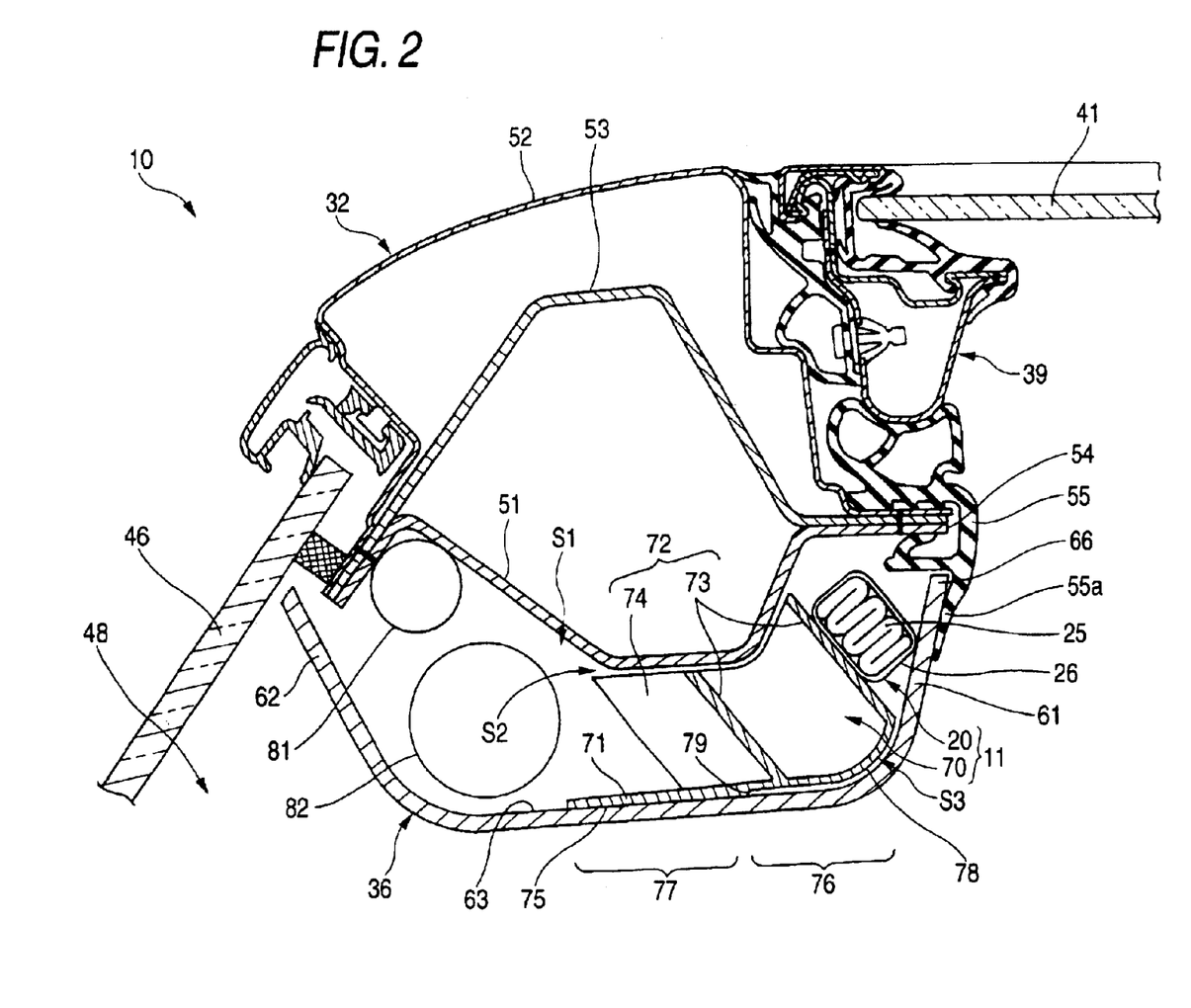
FIG. 2 is a sectional view taken along the line 2—2 in FIG. 1.

FIG. 2 is a sectional view taken along the line 2—2 in FIG. 1 and shows that a windscreen 46 is mounted to a front end portion of the right-hand side front pillar 32 and that the front door 39 is mounted to a rear end portion thereof in such a manner as to opened and closed.

The front pillar 32 is a structure having a closed cross section and includes a pillar inner panel 51 disposed on a passenger compartment 48 side and a pillar outer panel 52 disposed on an external side of the vehicle and is reinforced by partitioning an interior space of the closed cross section with a reinforcing material 53. The front pillar 32 has a rear flange portion 54 at which a flange portion at a rear end of the pillar inner panel 51 and a flange portion at a rear end of the pillar outer panel 52 overlap and are attached to each other.

The rear flange portion 54 extends towards the rear of the vehicle terminates as an edge of a front door opening. An interior weather-strip 55 is mounted on the rear flange portion 54 for sealing the front door 39 by being brought into contact with an inner surface of an edge of the front door 39 when the front door 39 is closed.

The invention is characterized in that the front pillar garnish 36 is disposed on the passenger compartment 48 side of the front pillar 32 with a predetermined amount of space S1 being provided therebetween, and the space S1 accommodates the roof side airbag 25 and a small impact absorbing member 70. The roof side airbag system 20 and the small impact absorbing member 70 constitutes a vehicle occupants protection system 11.

Specifically, the front pillar garnish 36 is a structure having a substantially U-shaped cross section which surrounds the entirety of the passenger compartment 48 side of the front pillar 32. This structure 36 is an elongated interior material which extends longitudinally along the front pillar 32 (that is, in the perpendicular direction to the surface of the figure).

As viewed from the top as in FIG. 2, a first portion 61 of the front pillar garnish 36 extends to the rear end of the front pillar 32 in the vicinity of the rear flange portion 54. By allowing an elastic lip 55a to extend from the interior weather-strip 55 to the first portion 61, the elastic lip 55a can be brought into an elastic contact with an external surface of the first portion 61. Consequently, the opening of the first portion 61 to the passenger compartment 48 side can be restricted by the elastic lip 55a.

In addition, a second, opposing portion 62 of the front pillar garnish 36 extends to the vicinity of a front end of the front pillar 32.

The figure shows that the roof side airbag 25 is disposed in the space S1 at the first portion 61 of the front pillar garnish 36 (on the right-hand side of the figure). The figure further shows that the small impact absorbing member 70 is disposed adjacent to and forward of the roof side airbag 25 (on the left-hand side of the figure) and that wiring harnesses 81, 82 are disposed forward of the small impact absorbing member 70.

The side airbag 25 is arranged and configured so as to be accommodated in a bag accommodation case 26 in a folded condition. The bag accommodation case 26 is attached to the front pillar 32 and is adapted to be broken when the side airbag 25 inflates upon deployment. Thus, the side airbag 25 can be attached to the front pillar 32.

In addition, the side airbag 25 includes a supplemental deployment member such as a string which is adapted to be deployed together with the side airbag 25 to perform a supplemental action to the bag. Hereinafter, whenever referring to the side airbag 25, the supplemental deployment member should be understood to be included therein.

The small impact absorbing member 70 is an elongate member extending longitudinally along the front pillar garnish 36. The member 70 functions to absorb an impact of such a small magnitude that the roof side airbag 25 remains unopened. The small impact absorbing member 70 is an integrally molded article including a bottom plate 71 which extends longitudinally along an inner surface 63 of the front pillar garnish 36 and a rib portion 72 extending from the bottom plate 71 toward the front pillar 32.

A slight space S2 is provided between the front pillar 32 and the front half portion of the rib portion 72. The rib portion 72 is a member constructed by arranging in parallel crosses a plurality of longitudinal ribs 73 . . . ( . . . notes a plural member, and this will be true hereinafter) which extend longitudinally along the front pillar garnish 36 and a plurality of lateral ribs 74 . . . which extend laterally in such a manner as to cross the plurality of longitudinal ribs 73 . . .

The front pillar garnish 36 and the small impact absorbing member 70 can each be formed of a non-metallic material (for example, a thermoplastic resin such as polypropylene) or a metallic material.

Figure 3:
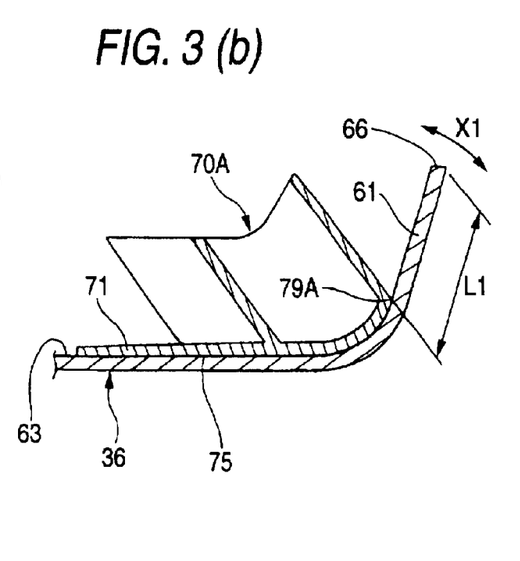
FIG. 3(a) is a diagram showing the constructions on the periphery of a front pillar garnish and a small impact absorbing member according to one possible embodiment of the invention.
FIG. 3(b) is a comparative diagram of FIG. 3(a)

FIGS. 3(a), 3(b) are diagrams showing the constructions on the periphery of the front pillar garnish and the small impact absorbing member. FIG. 3(a) corresponds to FIG. 2 and shows one possible embodiment of the invention and FIG. 3(b) shows an alternative small impact absorbing member as a comparison example.

FIG. 3(a) shows that a mounting seat 64 is made to extend from the front pillar garnish 36 toward the pillar inner panel 51 and that the front pillar garnish 36 is attached to the front pillar 32 by attaching the mounting seat 64 to the pillar inner panel 51 with a clip 65.

As shown in FIG. 3(a), one possible embodiment of the invention is characterized by the partial attachment of a bottom surface of the small impact absorbing member 70 or a bottom surface 75 of the bottom plate 71 to the front pillar garnish 36. The bottom surface can be divided into two portions, a rear half portion 76, which is located closer to the roof side airbag 25, and a front half portion 77, which is located farther away from the roof side airbag 25. Only the front half portion is attached to the front pillar garnish 36. Thus, the small impact absorbing member 70 is only attached to the front pillar garnish 36.

More specifically, the rear half portion 76 (the right-hand side half portion in the figure) is configured to be thinner than the front half portion 77. As a result, a separate open surface 78 which is spaced away from the inner surface 63 of the front pillar garnish 36 can be provided along the rear half portion 76 of the bottom plate 71. A gap S3 of a predetermined interval can be secured between the separate open surface 78 and the inner surface 63 of the front pillar garnish 36. Thus, the gap S3 of a predetermined interval can be provided between the rear half portion 76 of the bottom plate 71 and the inner surface 63 of the front pillar garnish 36. The length of the rear half portion 76 along which the gap S3 is provided is denoted by L2.

The front half portion 77 of the bottom surface 75 of the bottom plate 71 is configured to be attached to the front pillar garnish 36 through such methods as bonding, heat crimping, welding, ultrasonic welding, machine screwing or clipping. The resulting attachment is so strong that the small impact absorbing member 70 and the front pillar garnish 36 cannot separate from each other even when the front pillar garnish 36 is bent (or deformed).

In contrast, FIG. 3(b) illustrates a small impact absorbing member 70A, for which the entire bottom surface 75 is attached to an inner surface 63 of a front pillar garnish 36. In this comparison example, a first portion 61 of the front pillar garnish 36 is cantilevered to the remainder of the front pillar garnish 36 between a proximal end point 79A of a small impact absorbing member 70A and a distal end 66 of the front pillar garnish 36. A deformation end of this first portion 61 can bend towards the passenger compartment side of the vehicle at the proximal end point 79A as indicated by an arrow X1. The length of the deformation end is indicated by L1.

In contrast, the rear half portion 76 of the small impact absorbing member 70 according to the invention shown in FIG. 3(a) is not attached to the front pillar garnish 36. Consequently, the deformation end of the first portion 61 of the front pillar garnish 36 extends distally out from a proximal end point 79, located between the front half portion 77 and the rear half portion 76. The length from the distal end 66 of the front pillar garnish 36 to the proximal end point 79 is indicated by L3, which is longer than the comparison example shown in FIG. 3(b) by the length L2 of the rear half portion 76 along which the gap S3 is provided. Namely, "L3=L1+L2." Thus, according to the invention, the deformation of the first portion 61 of the front pillar garnish 36 toward the passenger compartment 48 side (a direction indicated by an arrow X1) can be facilitated in proportion to the increase in length of the deformation end of the first portion 61.

Next, the functions of the roof side airbag 25, the front pillar garnish 36 and the small impact absorbing member 70 will be described with reference to FIGS. 3(a), 4, and 5.

The thickness of the front pillar garnish 36 shown in FIG. 3(a), is configured such that the front pillar garnish 36 can perform its function as an interior material having an impact absorbing construction in the ordinary condition where no impact has been applied.

Even when the side of the vehicle 10 receives a light enough impact that the roof side airbag 25 remains unopened, the upper body (for example, the head or shoulder) of an occupant may hit against the front pillar garnish 36. If this occurs, the light impact can be transmitted quickly and efficiently from the front pillar garnish 36 to the small impact absorbing member 70. The small impact absorbing member 70 can absorb the impact energy through deformation. Namely, the small impact absorbing member 70 can absorb and carry the impact energy by being deformed when receiving the impact of such a small magnitude that the roof side airbag 25 remains unopened.

On the other hand, when the impact detecting sensors 21, 22 (refer to FIG. 1) detect that an impact of a predetermined magnitude or more is applied to a side of the vehicle 10, gas is generated to inflate the roof side airbag 25.

Figure 4:
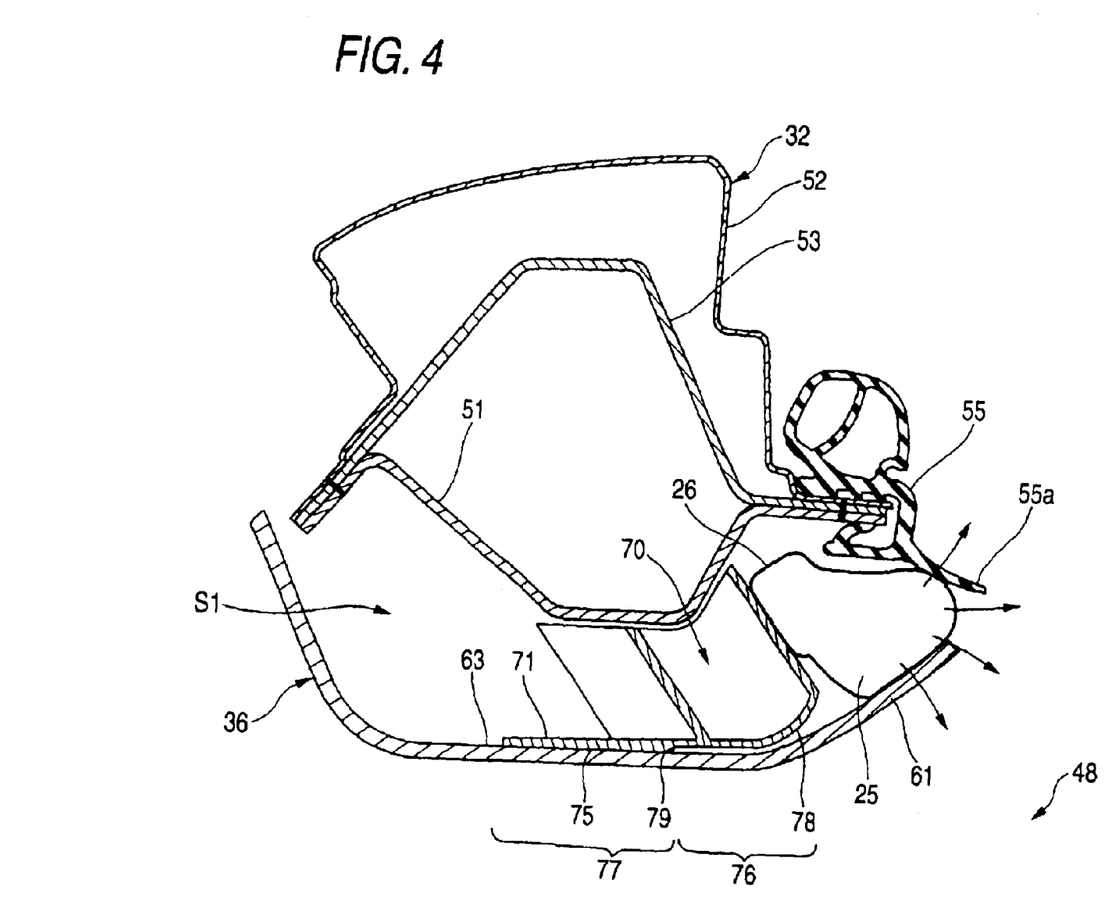
FIG. 4 is a diagram (Part 1) showing the function of a vehicle occupants protection system according to one possible embodiment of the invention.

FIG. 4 is a diagram (Part 1) showing the function of the vehicle occupants protection system according to one possible embodiment of the invention. FIG. 4 shows that the roof side airbag 25 expands into the passenger compartment 48 side while forcibly opening the first portion 61 of the front pillar garnish 36. The first portion 61 of the front pillar garnish 36 is pushed toward the passenger compartment 48 side at the proximal end point 79. The deformation end of the first portion 61 is thereby elastically deformed and thus allowed to separate from the lip portion 55a.

Figure 5:
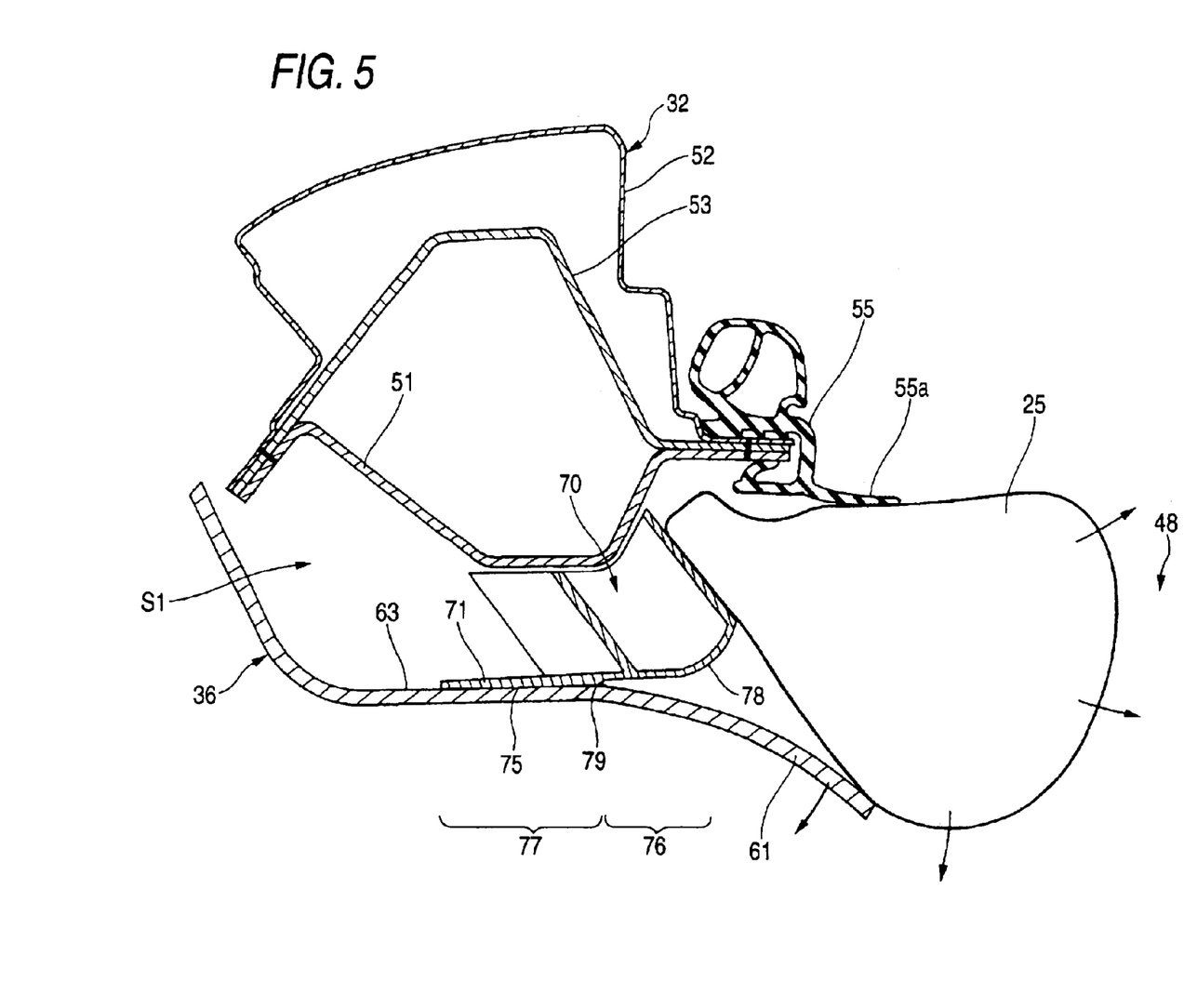
FIG. 5 is a diagram (Part 2) showing the function of the vehicle occupants protection system according to the embodiment shown in FIG. 4.

FIG. 5 is a diagram (Part 2) showing the function of the vehicle occupants protection system according to the embodiment of the invention shown in FIG. 4. The figure shows that the first portion 61 of the front pillar garnish 36 is pushed further toward the passenger compartment 48 side, the deformation end bending from the proximal end point 79 when the roof side airbag 25 further expands.

As shown in FIG. 3(a), the deformation end of the first portion 61 of the front pillar garnish 36 is located at the proximal end point 79. The length L3 from the distal end 66 to the proximal end point 79 is longer than the comparison example shown in FIG. 3(b) by the length L2 of the rear half portion 76 along which the gap S3 is provided. Thus, the first portion 61 of the front pillar garnish 36 can easily be deformed, bending toward the passenger compartment 48 side in proportion to the increase in the length of the deformation end of the first portion 61. Due to this, the first portion 61 of the front pillar garnish 36 is allowed to deform significantly upon a smaller application of force since it is not restricted by the small impact absorbing member 70.

Consequently, when the roof side airbag 25 is inflated, the first portion 61 of the front pillar garnish 36 can easily deform sufficiently to allow the roof side airbag 25 to expand quickly and smoothly. Thus, since the first portion 61 of the front pillar garnish 36 is allowed to deform significantly upon a smaller application of force, it is less likely that the roof side airbag 25 and/or the small impact absorbing member 70 may be damaged.

Moreover, the attachment between the front pillar garnish 36 and the front half portion 77 of the bottom surface 75 of the small impact absorbing member 70 is so strong that they do not separate even when the front pillar garnish 36 is bent (or deformed). The front half portion 77 is maintained in the attached condition. Due to this, even after the roof side airbag 25 has been inflated upon deployment, the small impact absorbing member 70 remains attached to the front pillar 32 along with the front pillar garnish 36. Consequently, the small impact absorbing member 70 can still perform its function of absorbing impacts even after the roof side airbag 25 has been deployed.

In addition, the length L3 can be increased extremely easily without altering the layout relationship between the roof side airbag 25 and the small impact absorbing member 70 and/or enlarging the space S1.

Next, a modified example of a vehicle occupants protection system will be described while referring to FIGS. 6 and 7.

Figure 6:
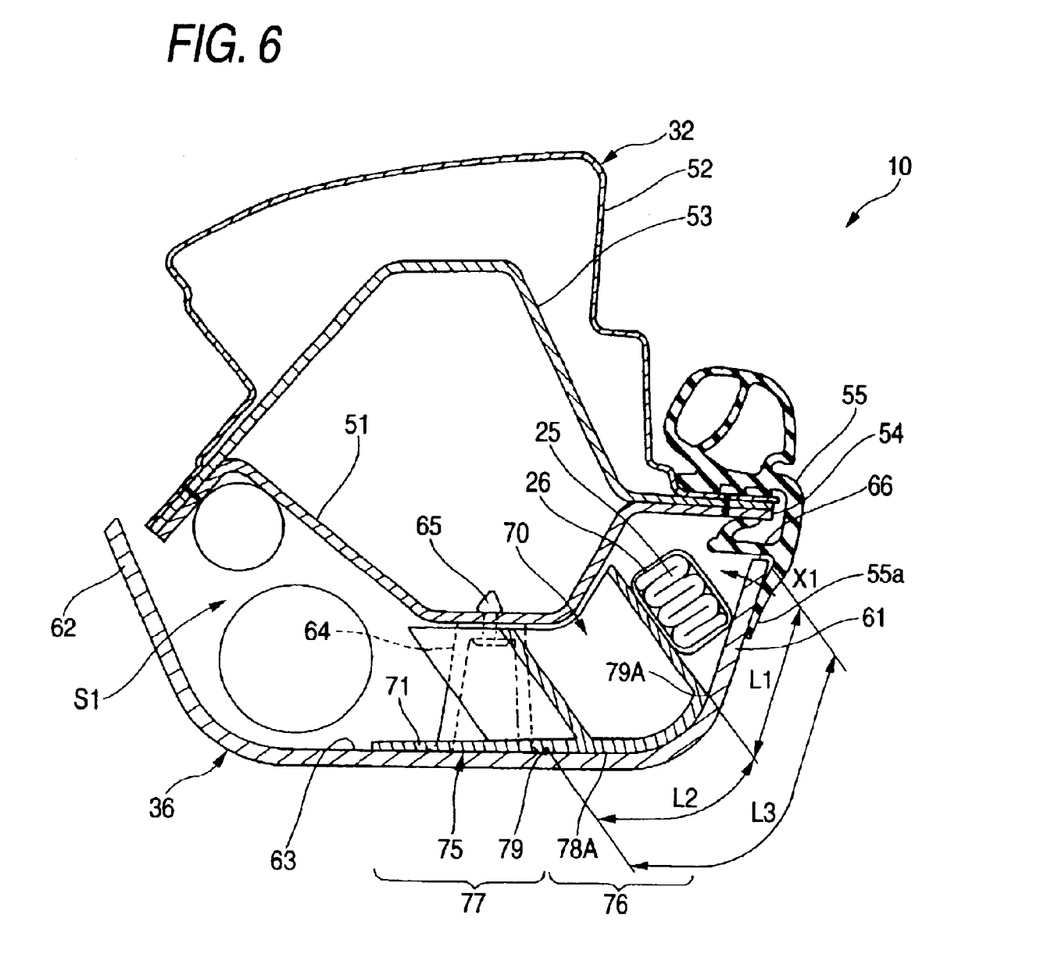
FIG. 6 is a diagram showing an alternative embodiment of the invention taken along the periphery of the front pillar garnish and the small impact absorbing member.

FIG. 6 corresponds to FIG. 3(a) and depicts a diagram showing an alternative embodiment taken along the periphery of the front pillar garnish 36 and the small impact absorbing member 70 and. Elements in FIG. 6 are labeled with the same reference numbers as the corresponding elements in FIG. 3(a). Therefore, the description thereof will be omitted.

In this alternative embodiment, both the rear half portion 76 and the front half portion 77 of a bottom surface of a small impact absorbing member 70 (or a bottom surface 75 of a bottom plate 71), are attached to a front pillar garnish 36.

The rear half portion 76 and front half portion 77 are configured to be attached to the front pillar garnish 36 through such methods as bonding, heat crimping, welding, ultrasonic welding, machine screwing or clipping.

This alternative embodiment of the invention is characterized in that a joining force between the front pillar garnish and the rear half portion 76 is weaker than a joining force between the front pillar garnish and the front half portion 77. Here, the term "joining force" refers to the strength and durability of an attachment between objects. The joining force at the front half portion 77 is so strong that the front pillar garnish 36 does not separate from the front half portion 77 even when the front pillar garnish 36 is bent (or deformed). The joining force at the rear half portion 76 is so weak that the front pillar garnish 36 separates from the rear half portion 76 when the front pillar garnish 36 is bent (or deformed).

Thus, a surface 78A adapted to easily separate from an inner surface 63 of the front pillar garnish 36 or a separate open surface 78A can be provided along the rear half portion 76 of the bottom plate 71. The length of the rear half portion 76 along which the separate open surface 78A is provided is labeled L2.

Next, the functions of the roof side airbag 25, the front pillar garnish 36 and the small impact absorbing member 70 of the alternative embodiment will be described referring to FIGS. 6 and 7.

In FIG. 6, the front pillar garnish 36 acts as an interior material having an impact absorbing construction in the ordinary condition where no impact has been applied.

When a light impact, meaning an impact of such a small magnitude that the roof side airbag 25 remains unopened, is applied to a side of the vehicle 10, the light impact can be transmitted quickly and efficiently from the front pillar garnish 36 to the small impact absorbing member 70. The small impact absorbing member 70 absorbs the impact energy by deforming.

In contrast, when an impact of a predetermined magnitude or more is applied to a side of the vehicle 10, gas is generated to inflate the roof side airbag 25.

Figure 7:
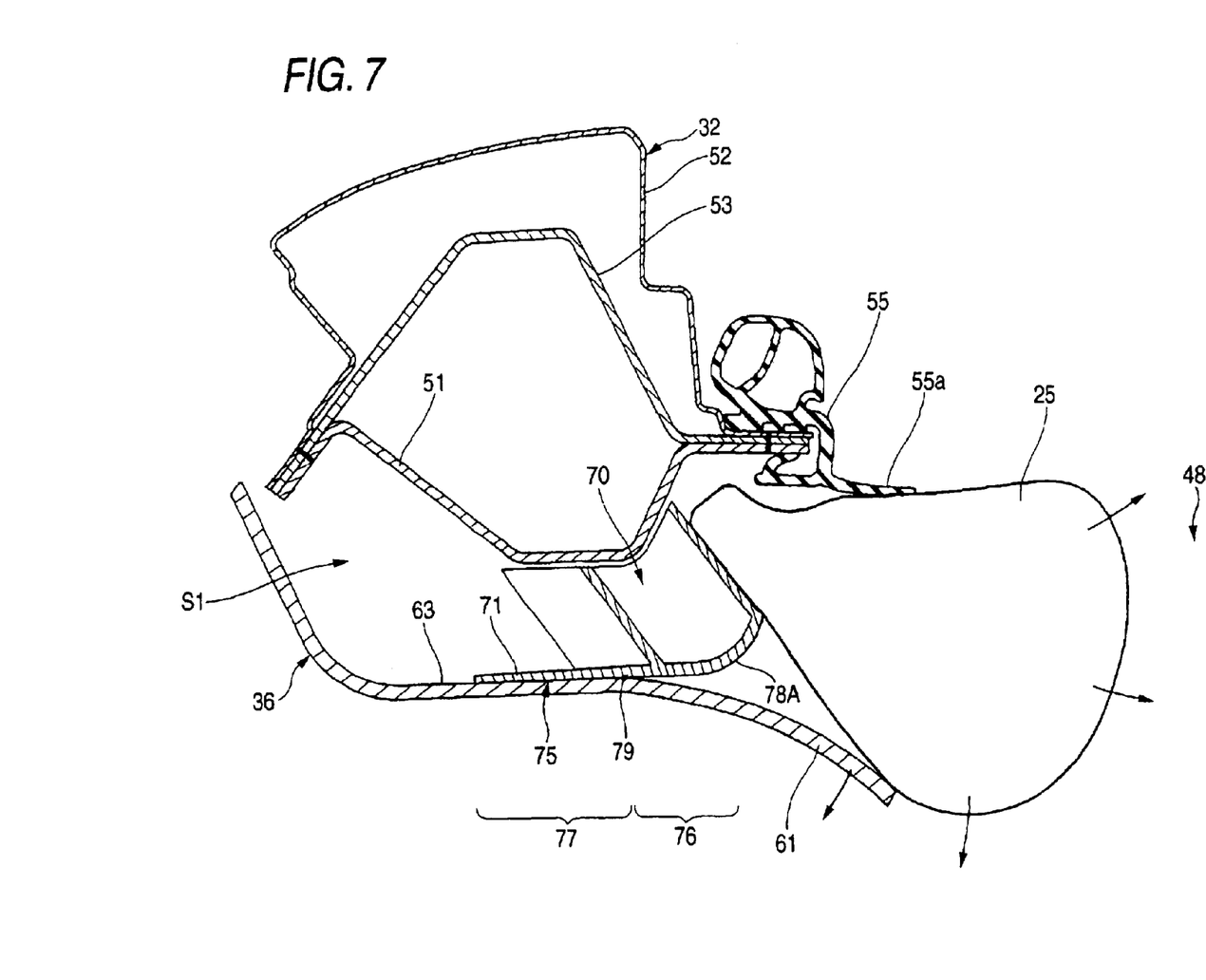
FIG. 7 is a diagram showing the function of the vehicle occupants protection system (the alternative embodiment) according to the embodiment shown in FIG. 6.

FIG. 7 is a diagram showing the function of the alternative embodiment of the vehicle occupants protection system. According to the figure, the first portion 61 of the front pillar garnish 36 is pushed toward the passenger compartment 48 side, pivoting on the proximal end point 79, which functions as the point of deformation when the roof side airbag 25 is inflated.

When the front pillar garnish 36 is deformed by the force of the inflating roof side airbag 25, a large magnitude of separation force is applied to the portion where the front pillar garnish 36 and the bottom surface 75 of the small impact absorbing member 70 are joined together. To cope with this, the joining force at the rear half portion 76 of the bottom surface 75 is set to be weak enough that it will separate from the front pillar garnish 36 when the large magnitude of separation force is applied, leaving the front half portion 77 intact.

Referring back to FIG. 6, a deformation end of the first portion 61 of the front pillar garnish 36 begins at a proximal end point 79. When compared to the system depicted in FIG. 3(b), the length L3 of the deformation end, which extends from a distal end 66 to the proximal end point 79, is longer by the length L2 of the rear half portion 76. The deformation of the first portion 61 of the front pillar garnish 36 toward the passenger compartment 48 side (a direction indicated by an arrow X1) can be facilitated in proportion to the increase in length of the deformation end of the first portion 61. Thus, the one end portion 61 of the front pillar garnish 36 is allowed to deform significantly upon a smaller application of force since it is not restricted by the small impact absorbing member 70.

Consequently, when the roof side airbag 25 is inflated, the first portion 61 of the front pillar garnish 36 can easily deform enough to allow the roof side airbag 25 to inflate quickly and smoothly. Since the front pillar garnish 36 is allowed to deform significantly upon a smaller application of force, it is less likely that the roof side airbag 25 and/or the small impact absorbing member 70 will be damaged.

Moreover, the joining force at the front half portion 77 of the bottom surface 75 of the small impact absorbing member 70 is so strong that the front pillar garnish 36 is not allowed to separate from it even when the front pillar garnish 36 is bent (or deformed). Rather, the front half portion 77 remains attached. Due to this, the small impact absorbing member 70 remains attached to the front pillar 32 along with the front pillar garnish 36 even after the roof side airbag 25 inflates upon deployment. Consequently, the small impact absorbing member 70 can perform its function to absorb impacts even after the roof side airbag 25 has been deployed.

In addition, the length L3 can be increased extremely easily without altering the layout relationship between the roof side airbag 25 and the small impact absorbing member 70 and/or expanding the space S1.

Figure 8:
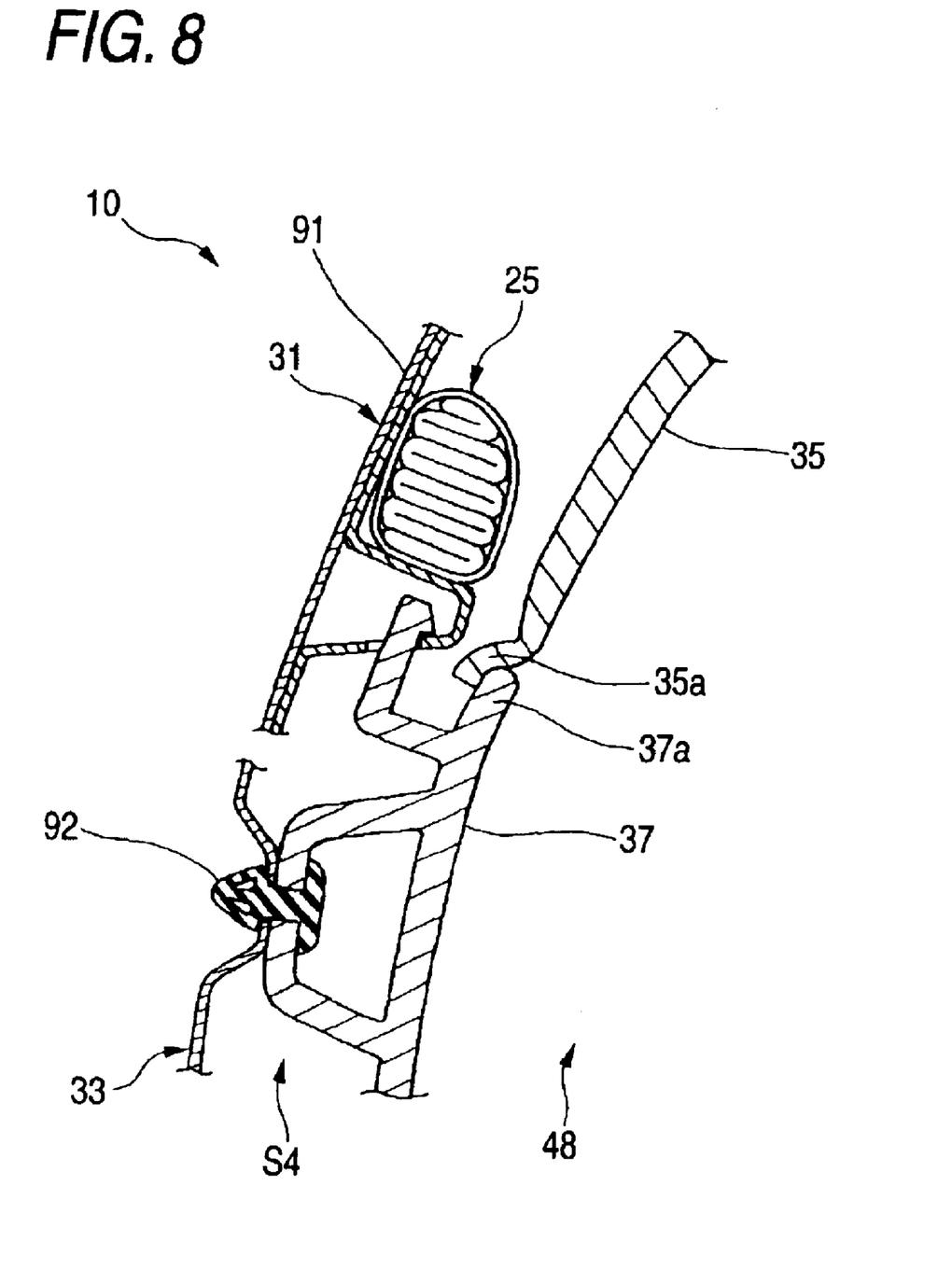
FIG. 8 is a sectional view taken along the line 8—8 in FIG. 1.

FIG. 8 illustrates a sectional view taken along the line 8—8 in FIG. 1 and shows that the center pillar garnish 37 is attached in such a manner as to secure a predetermined amount of space S4 on the passenger compartment 48 side of a roof panel 91 of the roof 31 and the center pillar 33, respectively. The roof lining 35 is attached in such a manner as to secure a predetermined amount of space S4 on the passenger compartment 48 side of the roof panel 91 and that the roof side airbag 25 is accommodated in the space S4.

The roof lining 35 can be fastened to the center pillar garnish 37 by allowing a lower end portion 35a of the roof lining 35 to be hooked on the back of an upper end portion 37a of the center pillar garnish 37. Reference numeral 92 denotes a center pillar garnish attachment clip.

Figure 9:
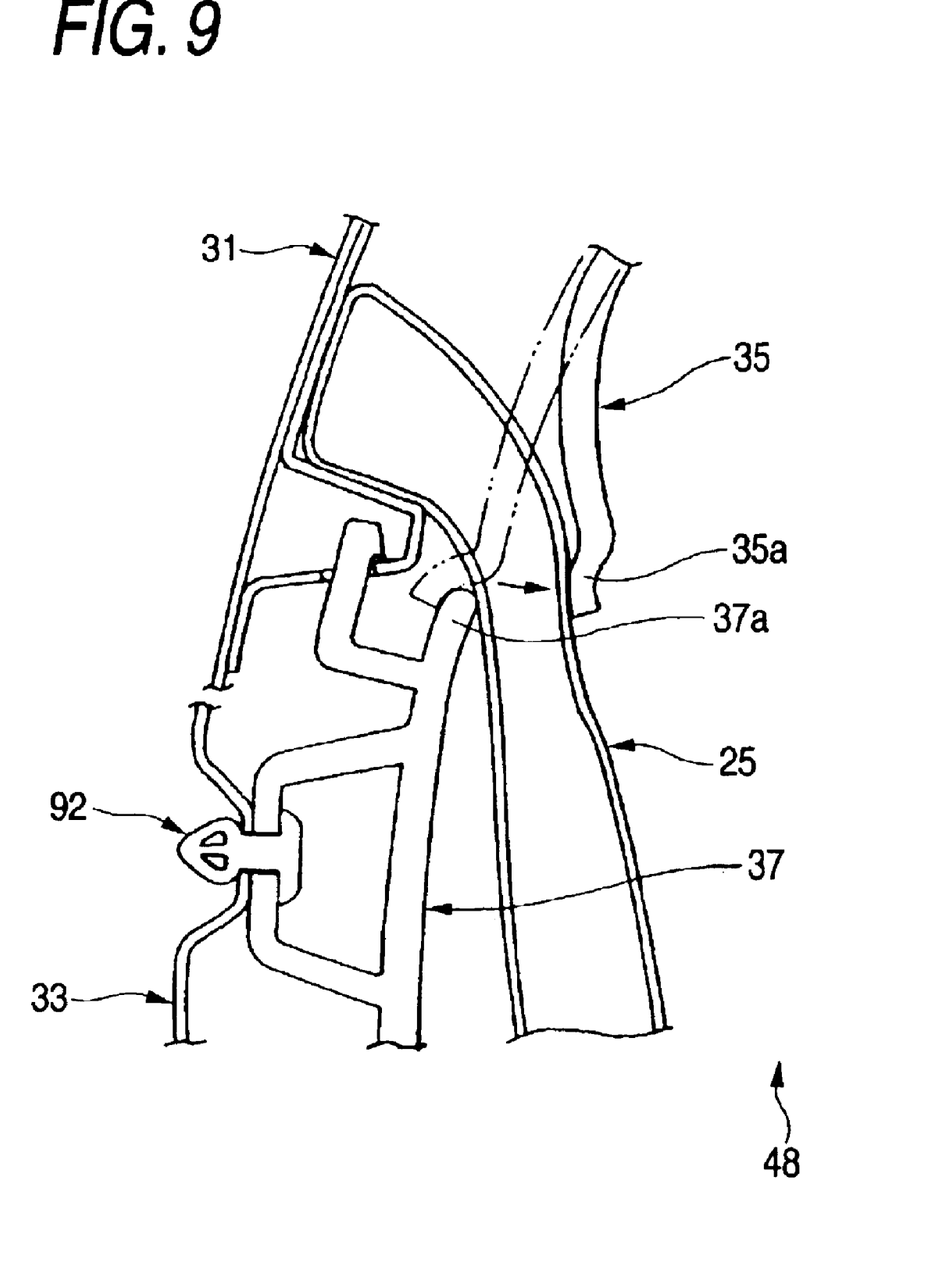
FIG. 9 is a diagram showing the function of a roof side airbag according to one possible embodiment of the invention at a portion where a center pillar garnish is located.

FIG. 9 corresponds to FIG. 8, illustrating a diagram showing the function of the roof side airbag according to one possible embodiment of the invention as viewed at the location of the center pillar garnish.

The figure shows that the roof side airbag 25 inflates into the passenger compartment 48 side while forcibly opening the lower end portion 35a of the roof lining 35. The lower end portion 35a elastically deforms toward the passenger compartment 48 side, whereby the lower end portion 35a is allowed to separate from the upper end portion 37a of the center pillar garnish 37. As a result, the roof side airbag 25 is allowed to inflate downwardly into the passenger compartment 48.

Figure 10:
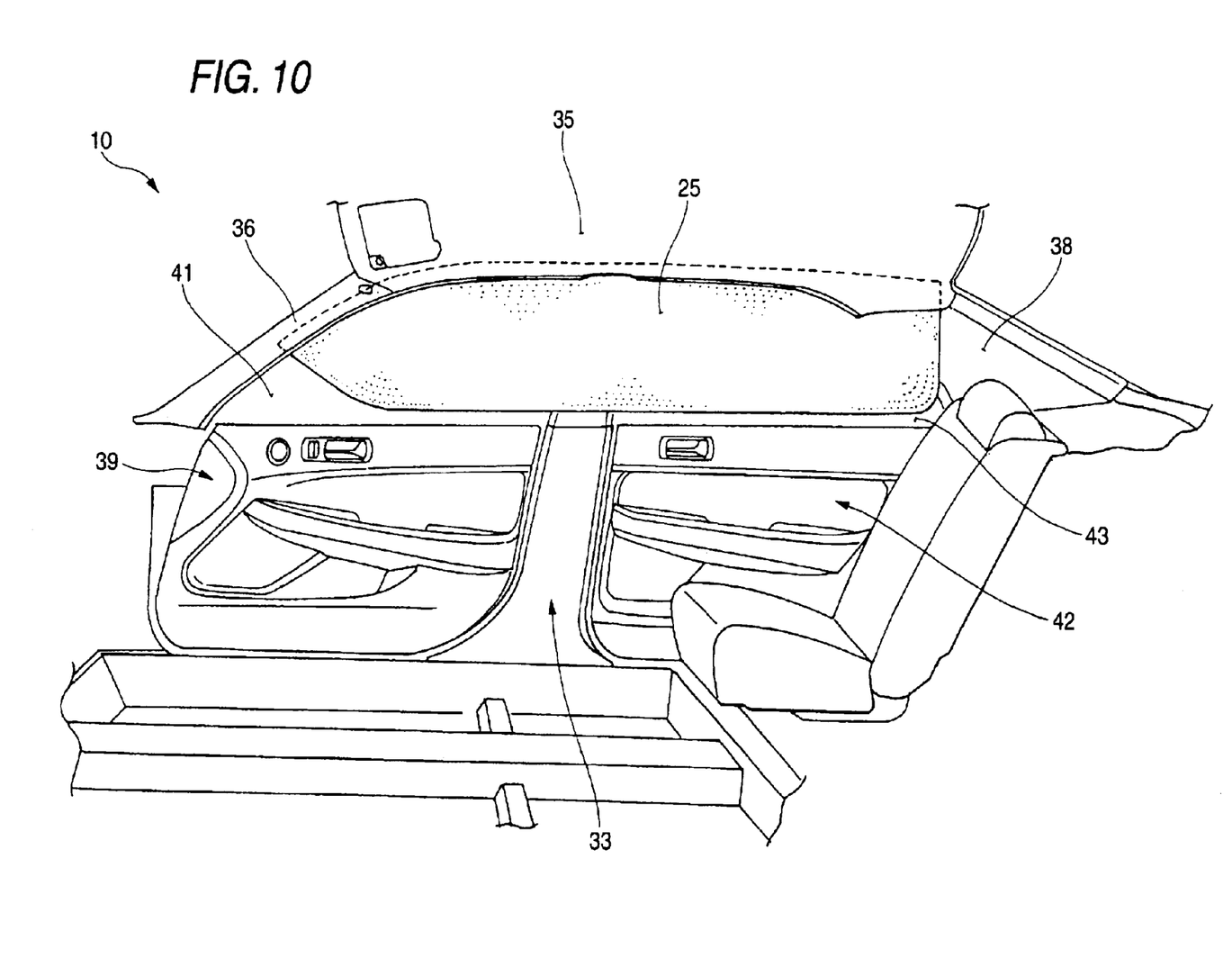
FIG. 10 is a diagram showing the function of the roof side airbag according to one possible embodiment of the invention.

FIG. 10 is a diagram showing the function of the roof side airbag according to one possible embodiment of the invention. The figure illustrates that the roof side airbag 25 inflates along the front door window glass 41 and the rear door window glass 43, expanding downward. Thus, the upper bodies (for example, the heads and/or shoulders) of the occupants can be protected by the roof side airbag 25 inflating when an impact of a predetermined magnitude or more is applied to a side of the vehicle.

Note that in this embodiment of the invention, the pillar which supports the roof 31 is not limited to the front pillar 32. Additionally, the pillar garnish is not limited to the front pillar garnish 36.

Furthermore, gaps S2 and S3 are optional.

According to first discussed embodiment of the invention, the deformation end at the first portion of the front pillar garnish can be set at the proximal end point between the rear half portion of the bottom surface of the small impact absorbing portion and the front half portion by attaching the front half portion to the pillar garnish. This increases the length of the deformation end of the pillar garnish, facilitating the deformation of the first portion of the front pillar garnish in proportion to the increase in length. Therefore, the first portion of the front pillar garnish is allowed to deform significantly upon a smaller application of force since it is not restricted by the small impact absorbing member. The first portion of the front pillar garnish is allowed to deform easily enough to allow the roof side airbag to inflate quickly and smoothly when the roof side airbag is deployed.

Moreover, the front half portion of the bottom surface of the small impact absorbing member remains attached to the pillar garnish. Therefore, even after the roof side airbag has been inflated outwardly upon deployment, the small impact absorbing member remains attached to the pillar along with the pillar garnish. Consequently, the small impact absorbing member can perform its impact absorbing function even after the roof side airbag has been deployed.

In addition, the length of the deformation end can be enlarged extremely easily without altering the layout relationship between the roof side airbag and the small impact absorbing member and/or enlarging the space provided between the front pillar and the front pillar garnish.

Furthermore, since the small impact absorbing member is separated from the pillar garnish, optimal materials can be selected for the respective members. For example, the pillar garnish can be formed of a soft material, whereas the small impact absorbing member can be formed of a hard material.

Furthermore, in the ordinary condition where no impact has been applied, the front pillar garnish can sufficiently perform its function as the interior material.

Moreover, when the side of the vehicle receives an impact of such a small magnitude that the roof side airbag remains unopened, the impact can be transmitted quickly and efficiently from the front pillar garnish to the small impact absorbing member.

According to the second discussed embodiment of the invention, the joining force at the rear half portion of the bottom surface of the small impact absorbing member is weaker than the joining force at the front half portion. The joining force at the rear half portion is so weak that the pillar garnish is allowed to separate from the rear half portion when the pillar garnish is deformed upon application of a separation force of significant magnitude. Consequently, the deformation end of the first portion of the front pillar garnish can be set at the proximal end point between the rear half portion and the front portion. This increases the length of the deformation end, facilitating the deformation of the first portion of the front pillar garnish in proportion to the increase in length. This allows in turn the first portion of the front pillar garnish to deform significantly upon a smaller application of force since it is not restricted by the small impact absorbing member. The first portion of the front pillar garnish is thus allowed to deform easily enough to allow the roof side airbag to inflate outwardly quickly and smoothly.

Moreover, only the rear half portion of the bottom surface of the small impact absorbing member is caused to separate from the pillar garnish while the front half portion is remains attached. Due to this, even after the roof side airbag has been inflated upon deployment, the small impact absorbing member remains attached to the pillar along with the pillar garnish. Consequently, the small impact absorbing member can continue to absorb impacts even after the roof side airbag has been deployed.

In addition, the length of the deformation end of the pillar garnish can be enlarged extremely easily without altering the layout relationship between the roof side airbag and the small impact absorbing member and/or enlarging the space provided between the pillar and the front pillar garnish.

Furthermore, since the small impact absorbing member is separated from the pillar garnish, optimal materials can be selected for the respective members. For example, the pillar garnish can be formed of a soft material, whereas the small impact absorbing member can be formed of a hard material.

Furthermore, in the ordinary condition where no impact has been applied, the front pillar garnish can function sufficiently as the interior material.

In addition, when the side of the vehicle receives an impact of such a small magnitude that the roof side airbag remains unopened, the impact can be transmitted quickly and efficiently from the front pillar garnish to the small impact absorbing member.

What is claimed is:

1. A vehicle occupants protection system comprising:
   a pillar garnish mounted on a passenger compartment side of a pillar which supports a roof to define a predetermined amount of space between said pillar and said pillar garnish;
   a roof side airbag accommodated in said space, said roof side airbag being inflated by gas generated when an impact of a predetermined magnitude or more is applied to a side of a vehicle so as to expand into the passenger compartment side of said vehicle while forcibly opening one end portion of said pillar garnish;
   a small impact absorbing member accommodated in said space, for absorbing an impact of such a small magnitude that said roof side airbag remains unopened; and
   wherein a bottom plate of said small impact absorbing member includes a first portion is located closer to said roof side airbag that is free from being attached to said pillar garnish, and a second portion is located farther away from said roof side airbag that is attached to said pillar garnish, the first portion defining a bottom surface that does not impact the pillar garnish upon deployment of the airbag.

2. The vehicle occupants protection system according to claim 1, wherein said bottom plate of said small impact absorbing member is joined to said pillar garnish through one of bonding, heat crimping, welding, ultrasonic welding, machine screwing and clipping.

3. The vehicle occupants protection system according to claim 1, wherein the bottom plate of said impact absorbing member is formed in such a manner that a thickness thereof at the first portion is thinner than that at the second portion so as to define a gap between said pillar garnish and said small impact absorbing member at the first portion.

4. A vehicle occupants protection system comprising:
   a pillar garnish mounted on a passenger compartment side of a pillar which supports a roof to define a predetermined amount of space between said pillar and said pillar garnish;
   a roof side airbag accommodated in said space, said roof side airbag being inflated by gas generated when an impact of a predetermined magnitude or more is applied to a side of a vehicle so as to expand into a passenger compartment of said vehicle while forcibly opening one end portion of said pillar garnish; and
   a small impact absorbing member joined to said pillar garnish at a bottom surface thereof so as to be accommodated in said space portion, said small impact absorbing member absorbing an impact of such a small magnitude that said roof side airbag remains unopened,
   wherein a joining force at a portion of said bottom surface of said small impact absorbing member which is located closer to said roof side airbag is set smaller than a joining force at a portion of said bottom surface of said small impact absorbing member which is located farther away from said roof side airbag, said smaller joining force being a force which is so weak that said pillar garnish is allowed to separate from said bottom surface of said small impact absorbing member when said pillar garnish is deformed.

5. The vehicle occupants protection system according to claim 4, wherein said bottom surface of said small impact absorbing member is joined to said pillar garnish through one of bonding, heat crimping, welding, ultrasonic welding, machine screwing and clipping.

* * * * *